Nov. 20, 1945. R. N. STEFFENS 2,389,560
APPARATUS FOR MAKING THERMOPLASTIC JOINTS
Original Filed March 26, 1942
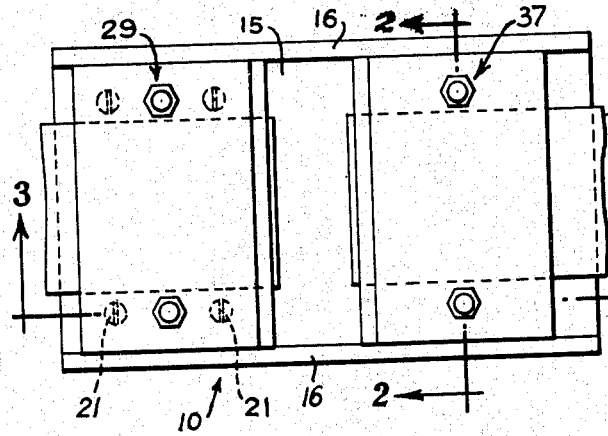
FIG. 1.
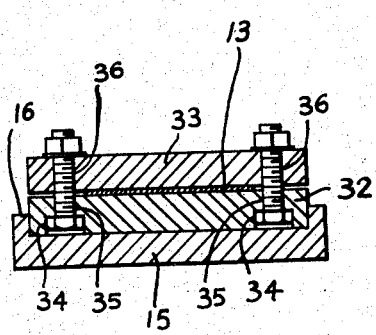
FIG. 2.
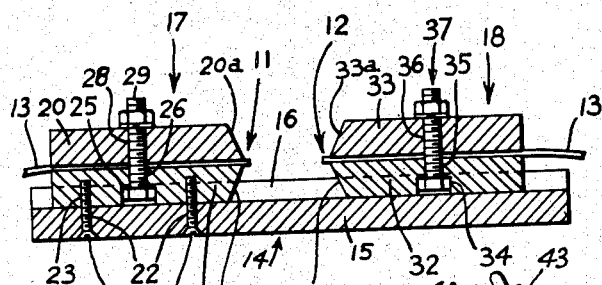
FIG. 3.
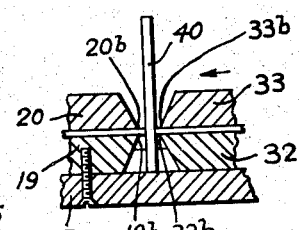
FIG. 4.
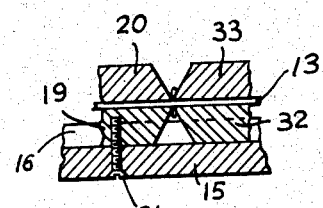
FIG. 5.
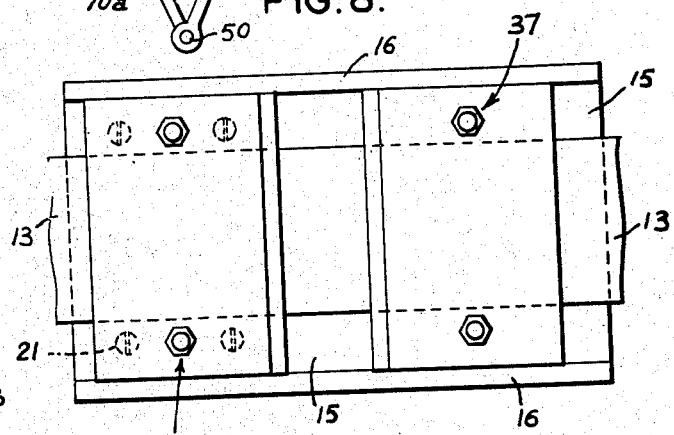
FIG. 8.
FIG. 7.
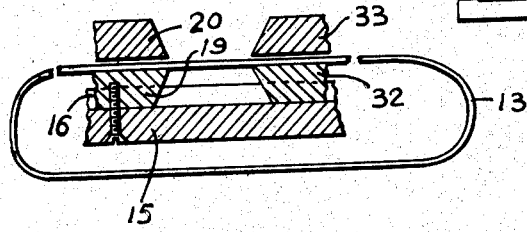
FIG. 6.
INVENTOR.
ROBERT N. STEFFENS
BY
J. B. Felshin
ATTORNEY Patented Nov. 20, 1945

2,389,560

UNITED STATES PATENT OFFICE 2,389,560

APPARATUS FOR MAKING THERMOPLASTIC JOINTS

Robert N. Steffens, New York, N. Y.

Original application March 26, 1942, Serial No. 436,256. Divided and this application November 2, 1943, Serial No. 508,725

3 Claims. (Cl. 154—42)

This invention relates to apparatus for making thermoplastic joints, particularly for joining strips of thermoplastic material, or the ends of a strip of such material to produce a belt of uniform thickness. This application is a division of my co-pending application Serial No. 436,256, filed March 26, 1942, for Methods of and apparatus for making thermoplastic joints. issued as Patent No. 2,379,500, dated July 3, 1945.

An object of this invention is to provide a highly improved apparatus of the character described, for joining meeting ends of strips of thermoplastic material, or the ends of a strip of such material to make a belt, without any overlapping of material at the joint, and so that the material at the joint is of uniform thickness with the remainder of the strip or belt.

One application of the improved apparatus is forming endless die wiping belts for die stamping presses used for imprinting from intaglio engraved plates and dies, the belts serving to remove surplus ink from the plate or die surface. The construction of die stamping presses prohibits installation of pre-formed endless wiping belts into the press. For this reason, the strip of wiping material must be threaded through the various parts of the press and the ends of the belt must then be attached together, so as to form an endless belt. The present improved process is particularly applicable for attaching the ends of a wiping belt made of thermoplastic material such as "Pliofilm," "vinyl resin," "Vinylite," "Koroseal," or the like thermoplastic sheets.

Another object of this invention is to provide an improved apparatus of the character described, which may be easily manipulated, and which shall be inexpensive to construct and economical to operate, and which may be used for joining together the ends of a strip of thermoplastic material threaded through the mechanisms of a die stamping press to join the ends of the strip together for producing an endless belt of uniform thickness throughout, without any increase in thickness or bumps at the joint.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing in which is shown one of the various possible illustrative embodiments of this invention, Fig. 1 is a top plane view of apparatus embodying the invention;

Fig. 2 is a cross-sectional view taken on line 2—2 of Fig. 1;

Fig. 3 is a cross-sectional view taken on line 3—3 of Fig. 1;

Fig. 4 is a partial view similar to Fig. 3, and illustrating another step in the process;

Fig. 5 is a view similar to Fig. 4, and illustrating still a further step in the process;

Fig. 6 is a view similar to Fig. 5, and illustrating the clamps loosened and separated after the strip ends are joined together to form a belt;

Fig. 7 is a top plan view of the structure shown in Fig. 6; and

Fig. 8 is a side elevational view of apparatus embodying the invention, and illustrating a modified construction.

Referring now in detail to the drawing, 10 designates a clamp forming part of the apparatus embodying the invention, for joining together the ends 11 and 12 of a strip or strips 13 of thermoplastic material. The ends 11 and 12 may be the ends of a single strip, or the ends of a pair of strips of thermoplastic material. The thermoplastic material may be "vinyl resin," "Vinylite," "Koroseal," "Pliofilm," or the like thermoplastic material.

The clamp 10 comprises a guide member 14 having a bottom wall 15, and parallel, upstanding guide flanges 16. On the guide 14 is a fixed clamp 17 and a slidable clamp 18. Fixed clamp 17 comprises a pair of substantially similar, symmetrically disposed jaws or clamp plates 19 and 20. The clamp plates 19 and 20 have a width equal to the distance between the flanges 16. Said plates have horizontal top and bottom surfaces and may be of substantially similar thickness.

The bottom plate 19 may be fixed to the guide 14 by screws 21 screwed through vertical threaded openings 22 in the bottom wall 15, and through threaded openings 23 in the underside of plate 19, registering with the openings 22. The openings 22 and 23 are located adjacent the flanges 16. Plate 19 is furthermore formed on the underside thereof with a pair of countersunk sockets 25, located in alignment with the threaded openings 23. Said plate 19 is furthermore formed with vertical through openings 26, communicating with the sockets 25.

The upper jaw plate 20 is formed with vertical through openings 28, registering with the openings 26. Extending through the registering openings 26 and 28, are bolts 29 having heads located within the countersunk sockets 25. Nuts are screwed to the upper ends of the bolts 29, to press the plates 19 and 20 together.

It will be noted that one of the strips 13 is placed between the clamp jaws 19 and 20, with the end 11 of the strip projecting beyond the operating ends of said jaws. It will be noted furthermore, as illustrated in the drawing, that the forward ends of the plates 19 and 20 are inclined rearwardly and outwardly, as at 19a and 20a, for the purpose hereinafter appearing.

The sliding clamp 18 comprises a bottom jaw plate 32 and a top jaw plate 33 of the same width as the jaw plates 19 and 20. The clamp 18 is adapted to slide between the guide flanges 16, as shown in the drawing. Said jaw plates 32 and 33 are preferably of equal thickness, and similar to the thickness of the jaw plates 19 and 20.

The jaw plate 32 has countersunk sockets 34 on the underside thereof and is formed with vertical through openings 35. Each plate 33 is formed with vertical through openings 36, registering with the through openings 35. Extending through the through openings 35, 36, are bolts 37 having heads disposed within the sockets 34. Nuts are screwed to the upper end of the bolts to press the plates 32 and 33 together. The bolts 37 are spaced apart similarly to the bolts 39, so as to be disposed on opposite sides of the strip 13 which is received between the plates 32 and 33.

It will be noted that the forward end 12 of strip 13, gripped by the clamp 18, likewise projects beyond the inner ends of the jaw plates 32, 33. It will be noted furthermore that the forward ends of said jaw plates are inclined rearwardly and outwardly, as at 32a and 33a, similarly to the inclination of the surfaces 19a, 20a.

The operation of the apparatus to join together the meeting ends of the strips 13 will now be explained.

The two ends of the thermoplastic strips are firmly held by the clamps 17 and 18, with the inner ends of the strips projecting beyond the knife or shearing edges of the clamps. The projecting ends of the thermoplastic material are trimmed off against the leading edges of the clamps to square off the edges. The clamps are then loosened and more material is exposed and the clamps are then again tightened.

Clamp 18 is then moved towards clamp 17. However, a chromium plate or stainless steel blade or knife 40 heated to about 350° F. is interposed between the meeting ends of the strips, as illustrated in Fig. 4 of the drawing, so that the ends of the strips contact the opposite surfaces of the hot blade or strip of metal indicated by numeral 40 in the drawing.

Preferably about ⅛ of an inch of thermoplastic material projects from the inner ends of the two strips. The sliding clamp is then pressed toward fixed clamp 17 causing the protruding ends of the strips to press against opposite sides of the blade and become heated and plastic and soft. The hot blade 40 is then withdrawn and clamp 18 is moved further toward clamp 17 to the position shown in Fig. 5 to cause the plastic ends of the strips to meet and be pressed together so that they will become fused.

At the same time, the jaws 19b and 20b at the inner ends of the surfaces 19a, 20a, practically contact or do contact, the jaws 32b, 33b at the inner ends of the surfaces 32a, 33a, respectively, to smooth out the joint and make the joined portion of the strips of uniform cross-section. Excess material will be squeeze up and down into the V-shaped grooves formed between the surfaces 20a, 33a and 19a, 32a. These strips will be joined to the belt by a narrow neck and can be easily stripped off, or will be sheared off by the edges of the clamps.

The thermoplastic material will not become attached to the chromium plated or stainless steel hot blade. The portions of the clamps close to the heated edge are also preferably chromium plated, so that the plastic material will not adhere thereto. After the joint is formed bolts 37 may be loosened and clamp 18 may be moved back. The two clamps may then be opened up by withdrawing the nuts on the bolts 29 and 37.

It will thus be seen that there is formed a smooth butt joint edge to edge, and that the thickness of the joint is the same as the thickness of the strip or strips.

In Fig. 8 there is shown apparatus 10a embodying the invention and illustrating a modified construction. The apparatus 10a comprises a pair of clamps 40 and 41. Clamp 40 comprises a pair of similar, symmetrically disposed, clamping jaws 42. Each clamping jaw 42 comprises a thin knife blade 43 attached to or backed by a metal plate 44.

Clamp 41 comprises a pair of similar, symmetrically disposed jaws 45. Each jaw 45 comprises a knife blade 46 fixed to a backing plate 47. The knife blades 46 also extend beyond the backing plates. The jaws of each clamp may be attached together by screws similar to the screws 29 and 37 of Fig. 1. One of the jaws 42 of clamp 40 is attached to a rod 48. One jaw 45 of clamp 41 is attached to rod 49 pivoted to rod 48, as at 50. The clamps are on equal radii so that upon swinging rods 48 and 49 about their common hinge 50, the clamps will be brought together.

The strips 13 of thermoplastic material are gripped in the clamps and the meeting edges are brought into abutting relation by swinging the rods 48 and 49 relative to one another. The method of carrying out the process of forming a butt joint is similar to that described above for apparatus 10.

It will be noted that the edges of the clamps in apparatus 10 or 10a, adjacent to the thermoplastic material are shaped in such a way that the meeting edges of each clamp form approximate knife or shearing edges, with the body portion of the clamp relieved either by the formation of an acute angle or any other means. This construction results in a shearing pressure at the joining joint of the thermoplastic material, and also provides an area into which surplus material can readily flow.

It will be noted that the jaws may either be co-planar or swung about equal radii, it being a dominant feature of the invention that the jaws are so associated that relative movement therebetween will cause the inner edges of the thermoplastic strips to meet in abutting relation whereby to form a butt joint.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. Apparatus for joining together end portions of flat thermoplastic strips, comprising a pair of clamps, each clamp having means to grip an end portion of sheet thermoplastic material, and means to support said clamps for relative movement to bring one end portion into edge to edge contact with the other end portion, each of said clamps comprising a pair of jaws having parallel flat clamping surfaces adapted to contact opposite surfaces of one of said strips, the inner ends of the jaws of each clamp having shearing means at said clamping surfaces and being relieved from said clamping surfaces, beyond said shearing means to provide space to receive surplus sheared material.

2. Apparatus for joining together end portions of flat thermoplastic strips, a guide having a pair of clamps therein, each clamp having means to grip an end portion of sheet thermoplastic material, means to support said clamps for relative movement to bring one end portion into edge to edge contact with the other end portion, each of said clamps comprising a pair of jaws having parallel flat clamping surfaces adapted to contact opposite surfaces of one of said strips, the inner ends of the jaws of each clamp having shearing means at said clamping surfaces and being relieved from said clamping surfaces, beyond said shearing means to provide space to receive surplus sheared material, means to attach a jaw of one clamp to said guide, means for pressing together the jaws of each clamp, said other clamp being slidably mounted in said guide.

3. Apparatus for joining together end portions of flat thermoplastic strips, a guide having a pair of clamps therein, each clamp having means to grip an end portion of sheet thermoplastic material, means to support said clamps for relative movement to bring one end portion into edge to edge contact with the other end portion, each of said clamps comprising a pair of jaws having parallel flat clamping surfaces adapted to contact opposite surfaces of one of said strips, the inner ends of the jaws of each clamp having shearing means at said clamping surfaces and being relieved from said clamping surfaces, beyond said shearing means to provide space to receive surplus sheared material, means to attach a jaw of one clamp to said guide, means for pressing together the jaws of each clamp, said other clamp being slidably mounted in said guide, said guide having parallel guide flanges slidably engaging opposite sides of the second clamp.

ROBERT N. STEFFENS.